Figure 1:
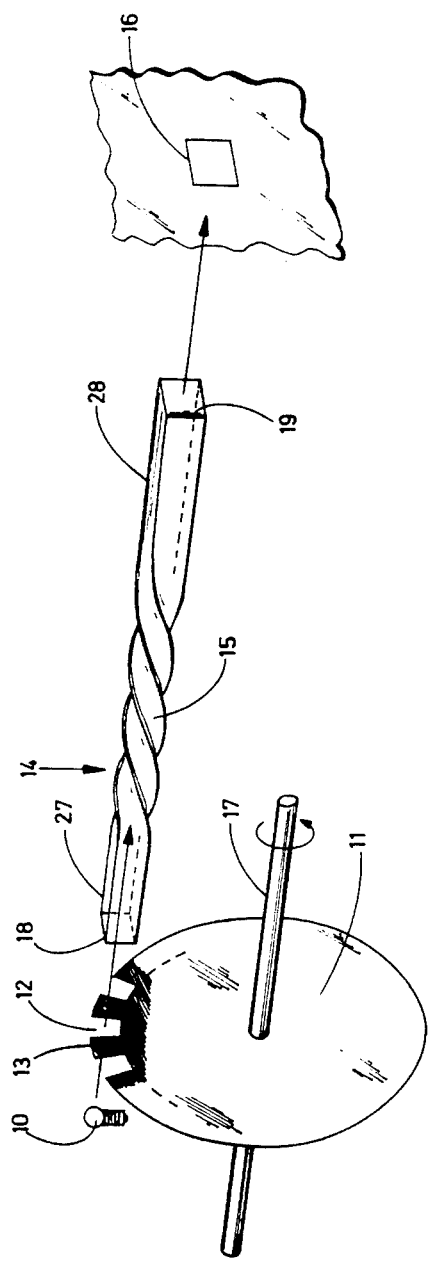

United States Patent
Klemt

[11] 3,752,561
[45] Aug. 14, 1973

[54] TORSIONED LIGHT CONDUCTING MEANS FOR THE ILLUMINATION OF AN IMAGE FIELD WITH MODULATED LIGHT

[75] Inventor: Arthur Klemt, Olching, Germany

[73] Assignee: Arthur Klemt Kommanditgesellschaft

[22] Filed: Aug. 12, 1971

[21] Appl. No.: 171,173

[30] Foreign Application Priority Data
Aug. 19, 1970 Germany.................. P 20 41 211.7

[52] U.S. Cl................................ 350/96 R, 350/274
[51] Int. Cl. .......................................... G02b 5/14
[58] Field of Search................. 350/96 R, 273, 274; 250/227; 240/1 EI

[56] References Cited
UNITED STATES PATENTS
| | | | |
|---|---|---|---|
| 1,351,562 | 8/1920 | Foster | 350/96 R X |
| 2,267,282 | 12/1941 | Larson | 350/96 R X |
| 3,195,405 | 7/1965 | Clark et al. | 350/273 X |
| 3,433,570 | 3/1969 | Hansen | 350/96 R UX |

Primary Examiner—John K. Corbin
Attorney—Louis E. Marn et al.

[57] ABSTRACT

Apparatus for uniformly illuminating an image area with modulated light is disclosed in accordance with the teachings of the present invention. Light of constant intensity is emitted from a light source and periodically interrupted by movable aperture means interposed in the light path extending between the light source and the image area. Elongated light conducting means including a helical portion formed about the longitudinal axis thereof receives the modualted light. The modulated light is subjected to multiple reflections while traversing the helical portion to cause a complete mixing of the received light. The mixed light is transmitted to the image area and admits of an intensity determined by the amount of light transmitted through the movable aperture means. A moving shadow is, therefore, not introduced across the surface of the image area.

9 Claims, 4 Drawing Figures

PATENTED AUG 14 1973

3,752,561

SHEET 1 OF 2

Inventor:

Arthur Kearns

TORSIONED LIGHT CONDUCTING MEANS FOR THE ILLUMINATION OF AN IMAGE FIELD WITH MODULATED LIGHT

This invention relates to a device for uniformly illuminating an image field with modulated light, comprising a light source and movable aperture means interposed in the light path.

In various technical applications it is suitable and desirable to illuminate an image field with modulated light, i.e., with light having an alternately increasing and decreasing intensity as, for example, between complete darkness and full illumination. An important application of this kind is, for example, automatic reading and classification of characters. In this application, an image field upon which a character to be recognized is superimposed, is illuminated and the light reflected from raster areas of the image field is projected onto photoelectrical converters. It is, of course, understood that the present invention admits of diverse use and is not limited solely to the application.

The reason for illuminating the image area with modulated light, is that the output voltage of presently available photoelectrical converters exhibits a strong dependence on temperature. If light of constant intensity is reflected thereon, then resulting changes of temperature may cause significant and unpredictable alterations in the output voltage of the photoelectrical converters. On the other hand, if a photoelectrical converter is illuminated with modulated light, then the generated modulated voltage can be made practically independent of the changes of temperature of the photoelectrical converters by appropriate circuitry.

In general, there are several possibilities for suitably modulating light. Some accepted techniques employ the use of a movable aperture having alternate transparent and opaque parts, said movable aperture being disposed in the light path extending between the light source and the image area; insertion of a Kerr-cell in the light path; or direct modulation of the intensity of the light source as for example, by the use of an arc-lamp. The light modulation obtained by the use of a Kerr-cell requires relatively complicated and expensive apparatus. In addition, without additional special devices and techniques, Kerr-cells do not readily permit the normally desirable complete darkening of received light, but are characterized by a relatively weak darkening of about 70 percent of the maximal light intensity. Therefore, the use of Kerr-cells does not afford satisfactory light modulation. If the light intensity of the light source, for example of an arc-lamp, is modulated directly, the shape of the modulation can be controlled only at great expense. Moreover, if a glow lamp light source is utilized, the necessary modulation frequencies cannot be obtained because of the thermal inertia of the filament. Hence, the direct modulation technique has not been enthusiastically received.

In the case of modulation with a movable aperture, a light impeding object is interposed in the light path extending between the light source and the image area to be illuminated, which, during the motion of the movable aperture, interrupts the light path resulting in a "chopping" effect on the light transmitted to the image area. Examples of movable apertures include a rotating drum with transparent and opaque portions, where the light source is disposed in the interior of the drum; an endless belt having transparent and opaque portions; an oscillating pendulum driven, for example, by a solenoid, and the like. A particularly simple and suitable device is a rotating disc which carries in circular arrangement, usually at the circumference thereof, transparent and opaque portions. Alternatively, the disc may be formed of an opaque material having uniformly spaced apertures therein. When the disc rotates, the light intensity at the image area that is illuminated varies between full intensity and complete darkness, with a frequency dependent upon the rotation frequency of the disc.

Modulation by means of a movable aperture which may be any of the aforementioned devices, causes considerable difficulties if the modulated light is reflected on to several photoelectrical converters arranged in the direction of motion of the movable aperture, as is the case, for example, in automatic reading machines wherein photoelectrical converters are arranged in the form of a matrix array which corresponds to a hypothetical raster field of an image area. If an opaque portion of the movable aperture moves through the light path extending between the light source and the image area, then, correspondingly, a shadow region caused by the opaque portion of the aperture moves across the image area from one side thereof to the other, and, therefore, traverses the array of photoelectrical converters in a corresponding manner. Thus, individual photoelectrical converters are illuminated for the same length of time, but not simultaneously. This causes a significant phase difference between the voltages generated by the individual photoelectrical converters. If the voltages generated by the various photoelectrical converters are processed in a parallel and simultaneous fashion, as is the case, for example, in automatic reading machines, then only negligible phase differences between the voltages generated by the individual photoelectrical converters can be tolerated.

Therefore, it is an object of the present invention to provide a device for uniformly illuminating an image area with modulated light.

It is another object of this invention to utilize a movable aperture interposed in a light path for modulating light by periodically interrupting said light path without producing a moving shadow region across an illuminated image area.

A further object of this invention is to provide apparatus for illuminating an area with modulated light wherein each portion of said area receives modulated light of substantially equal phase.

Another object of this invention is to provide a simple and inexpensive device employing a movable aperture for modulating the intensity of light and for projecting said modulated light uniformly across the surface of an image field such that each raster area of said image field simultaneously receives light admitting of substantially the same intensity.

Various other objects and advantages of the invention will become clear from the following detailed description of several exemplary embodiments thereof and the novel features will be particularly pointed out in connection with the appended claims.

In accordance with the present invention a device is provided for illuminating an image area with modulated light, comprising a light source, a movable aperture with alternating transparent and opaque portions disposed in the light path extending between the light source and the image area, and an elongated light conducting rod having a portion that is helically bent about the longitudinal axis thereof, said light conducting rod being adapted to transmit modulated light to said image area.

Preferably, the helically bent portion of the light conducting rod is located in the middle section of said rod and the end sections thereof are straight. The light conducting rod admits of a cross section that is multi-angular, especially rectangular or quadratic, wherein the helically bent portion of the light conducting rod is comprised of the torsion of the rod about its axis. Alternatively, the rod admits of circular cross-section wherein the helical portion thereof is comprised of a spiral formed by said rod about its axis.

The light receiving side of the light conducting rod may be a plane normal to the axis of the light conducting rod or may be formed into a cylindrical lens, the fictitious axis of which is orthogonal to the axis of the light conducting rod and orthogonal to the direction of motion of the movable aperture. The preferred embodiment depends upon the particular application of the present invention and upon the dimension of the helical portion. Preferably, the light conducting rod consists of glass or light-conducting plastic and includes a surface admitting of strong light reflectance. The glass or light-conducting plastic may be tinted.

Figure 2:
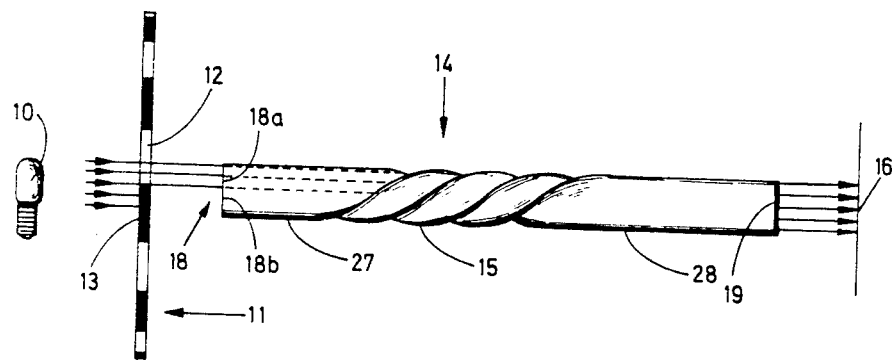
Figure 3:
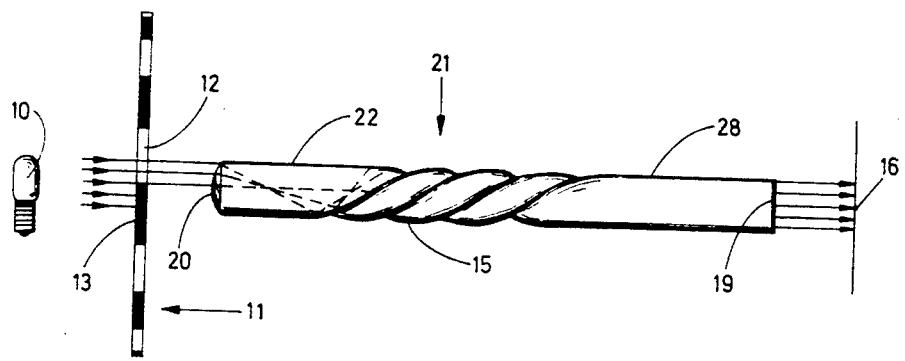
Figure 4:
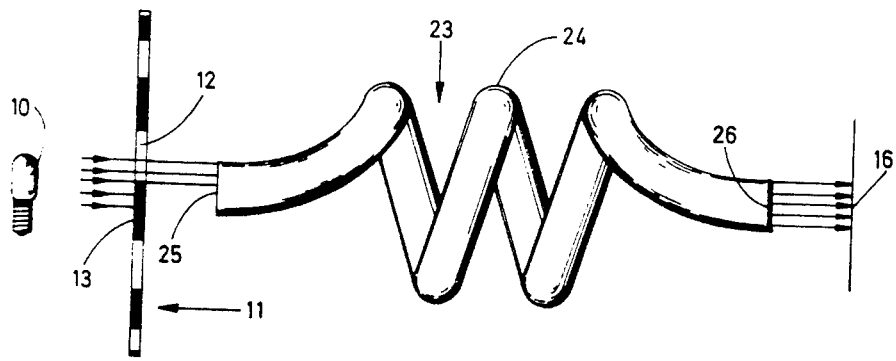

The invention will now be described in conjunction with the accompanying drawings wherein like reference numerals are used throughout and wherein:

FIG. 1 is a perspective view of one embodiment of the present invention;

FIG. 2 schematically illustrates an embodiment including a light conducting rod with torsion about its axis for the formation of a helically bent portion;

FIG. 3 schematically illustrates an embodiment including a light conducting rod similar to the light conducting rod of FIG. 2, and having a cylindrical lens at the light receiving side; and FIG. 4 illustrates an embodiment including a light conducting rod wherein the helical portion is obtained by a spiral shape of the light conducting rod.

Turning now to FIG. 1, the device comprises a light source 10, a movable aperture 11 with alternating transparent portions 12 and opaque portions 13, and an elongated light conducting rod 14 which includes a helical portion 15 about its axis. The light conducting rod 14 is interposed between the light source 10 and the image area 16 to be illuminated. Light source 10 may comprise any source of light that produces light of substantially constant intensity.

In the illustrated embodiment the movable aperture 11 is designed as a rotating disc. It is understood that any of the aforementioned devices, e.g., a rotating drum, an endless belt, an oscillating pendulum and the like, may conveniently be used as the movable aperture as long as the desired chopping of the light originating from the light source 10 is obtained. The movable aperture 11 is positioned in the light path extending between the light source 10 and the image area 16 such that the alternating transparent and opaque portions 12 and 13, respectively, are moved through the light path. In the illustrated embodiment, these portions are located at the circumference of the rotating disc. However, they can be located at any radial position as long as they move through the path. It is readily apparent that the transparent portions 12 may merely comprise apertures cut into the body of the disc 11. The disc 11 rotates about its axis 17 at a constant angular velocity. For light modulation wherein the time durations of light and darkness are equal, as is desirable in most cases, the transparent portions 12 and the opaque parts 13 have equal width. Thus, the apertures are uniformly spaced about the circumference of the disc. Obviously, by changing the ratio between transparent and opaque portions a corresponding change in the duration of light and darkness obtains.

The light conducting rod 14 is disposed in the light path extending between the movable aperture, hereinafter identified by the reference numeral 11, and the image area 16 to be illuminated and transmits the light passing through the transparent portions 12 that impinges on its light entering end 18 to its light exit end 19, which thus illuminates the image area 16. The helical shape of the light conducting rod may be obtained by torsion about its axis, as illustrated in FIGS. 1, 2 and 3, or by spirally winding the light conducting rod about its center line as illustrated in FIG. 4. The helical shape achieves a complete mixing of the light passing through the light conducting rod 14. The helical shape can extend over the entire length of the light conducting rod, or it may be limited to only a section of its length, such as the middle section thereof. The angle through which the light conducting rod is rotated (e.g., torsionally twisted or spirally wound) to form the helical shape should be at least 180°.

In the embodiment illustrated in FIG. 1 the light conducting rod 14 is comprised of a rod of rectangular or quadratic cross-section. The helically shaped portion 15 extends between straight end sections 27 and 28. The light entering end 18 of the light conducting rod preferably has about the same width as the transparent portions 12 of the movable aperture 11. At the light exit end 19 the cross-section of the light conducting rod 14 is adapted to the shape of the image area 16 to be illuminated. It is apparent that, if desired, the cross-section at the light exit end 19 may correspond to the cross-section at the light entering end 18. For example, to illuminate a rectangular image area, it is desirable to provide the light exit end 19 of the light conducting rod 14 with a rectangular cross-section having sides that exhibit a relationship defined by the image area to be illuminated. Accordingly, the entire image area will be illuminated uniformly.

FIG. 2 illustrates the light path traversed through a light conducting rod having a configuration of the type shown in FIG. 1, and therefore comprising a rod of rectangular or quadratic cross-section wherein the helical shape is obtained by a torsion of the rod about its axis. The rays of light emanating from light source 10 are indicated by arrowed lines. In FIG. 2, the movable aperture 11 is shown in a position wherein a partly transparent portion 12 and a partly opaque portion 13 thereof is interposed in the light path between the source of light 10 and the light conducting rod 14. Thus, as is illustrated by the indicated light rays, only a section 18a of the light entering end 18 of light conducting rod 14 receives light, whereas the remaining section 18b of the light entering end receives no light. The received light is transmitted substantially straight through the straight section 27 of the light conducting rod and then enters the helically shaped portion 15. In the helical portion 15, the light is reflected from the surface of the torsionally twisted light conducting rod several times at different planes of reflection. Thus, a substantially complete mixing of the light received from different sections of the light entering end 18 of the light conducting rod is effected in the helical portion. As a result of the multiple reflections and consequential mixing of received light, the light impinging on section 18a of the light entering end is distributed substantially uniformly over the entire cross-section of the light conducting rod 14. Therefore, at the light exit end 19, the light transmitted thereto is distributed uniformly over the entire cross-section thereof, and the intensity of said light is proportional to the area of the illuminated section 18a at the light entering end 18. If the width of the illuminated section 18a at the light entering end changes, as is the case when the aperture 11 moves (i.e., if the disc rotates), then the light intensity at the light exit end changes proportionally; however, the uniformity of distribution of the stream of light over the entire cross-section at the light exit end 19 is maintained. If the shadow-line generated by the transparent and opaque portions 12 and 13, respectively, of the movable aperture passes over the light entering end 18, then the light intensity at the light exit end 19 changes uniformly from full brightness to complete darkness. Moreover, the instantaneous intensity of the light transmitted to the light exit end 19 admits of substantially identical phase for all points of the light exit end. Since this light illuminates the image area 16, a substantially uniform modulation of light is obtained for the entire image area. This is schematically indicated by the uniform distribution of the arrowed light rays transmitted to image area 16.

In the exemplary embodiment wherein light entering end 18 is a plane normal to the longitudinal axis of light conducting rod 14 and an angle of torsion of the light conducting rod in the helical portion 15 is 180°, the phase difference of transmitted light between the farthest spaced apart points on the image area 16 is not more than 5°. Thus, if the present invention is utilized in cooperation with a character reader including a matrix array of photoelectrical converters, the phase angle between voltages generated by the farthest spaced apart photoelectrical converters is not more than 5°. Such small phase differences can be easily corrected by the use of conventional phase shifters in the character reader electronic circuitry, e.g., by the suitable dimensioning of elements such as resistors and the like, if such a correction is necessary at all.

In the embodiment illustrated in FIG. 3 the light entering end 20 of the light conducting rod 21, which corresponds to the aforedescribed light conducting rod 14 of FIGS. 1 and 2, forms a cylindrical lens, the fictitious axis of which is orthogonal to the axis of the light conductor and orthogonal to the direction of motion of the movable aperture 11. By utilizing a cylindrical lens at the light entering end 20 the phase difference between the farthest spaced apart points of the image area 16 will be further reduced. In this embodiment, a strong mixing of the light occurs in the straight section 22 of the light conducting rod 21 since the light received at different points on the light entering end 20 is refracted into the straight section 22 at different angles by the cylindrical lens, and thus is further reflected by the surface of the light conducting rod at different angles, as is indicated by the broken lines. Hence, a preliminary mixing of received light is obtained in the straight section 22 which, in conjunction with the subsequent mixing of the light in the helical portion 15 of the light conducting rod, further reduces the difference in phase of the light transmitted to image area 16 to about 1°. Accordingly, the modulation of light emanating from light source 10 results in the uniform illumination of image area 16 with light of varying intensity, but without a moving shadow region as heretofore encountered by the prior art.

In the embodiment illustrated in FIG. 4 the light conducting rod 23 is comprised of a rod of circular cross-section. The helical portion 24 is formed by spirally winding the rod about a center line. In this embodiment, as in the aforedescribed embodiments; the light received by the light entering end 25 is multiply reflected at different planes of reflection in the helical portion 24 by the surface of the light conducting rod 23, thus producing a uniform light distribution at the light exit end 26, the intensity of which is proportional to the illuminated section at the light entering end. It should be understood that, if desired the light entering end may form a cylindrical lens. The dimension of the illustrated spiral winding is only exemplary, the helical portion may be larger or smaller than that depicted and the slope of each winding may be more or less steep.

In each of the illustrated embodiments it should be obvious that the helical portion is formed such that the light entering the helical portion is reflected further into the light conducting rod toward the light exit end, and not back to the light entering end. Preferably, the light conducting rod is comprised of glass or light conducting plastic having surfaces of high optical reflectance. In most cases, this can be satisfactorily achieved by polishing the outer surface. However, in special cases the light conducting rod may be provided with a mirror surface.

The cross-section of the light conducting rod need not be uniform over its full length, e.g. it may have sections of multi-angular as well as sections of circular cross section. It is appreciated that a multi-angular rod may include a helical portion formed by spiral windings.

If tinted glass or tinted light-conducting plastic is used for the light conducting rod it is possible to obtain a proper adaptation for images of various colors. Accordingly in the application of the instant invention to automatic reading machines, image areas having coloured characters and/or coloured backgrounds may be accomodated. Similarly, the spectral distribution of the light originating from the light source and/or the spectral sensitivity of the photo sensors which receive the light reflected from the image area (such as photoelectrical converters) may be properly compensated without the necessity of additional filters. It is recognized that the manufacturing of helically shaped light conducting rods in accordance with the present invention may be achieved simply and economically.

While the present invention has been particularly shown and described with reference to specific embodiments thereof, it will be obvious to those skilled in the art that various changes and modifications in form and details may be made without departing from the spirit and scope of the invention. It is therefore intended that the appended claims be interpreted as including all such changes and modifications.

What is claimed is:

1. Apparatus for uniformly illuminating an image area with modulated light, comprising:

a light source for emitting light of a constant intensity;

movable aperture means having alternating transparent and opaque portions interposed in the light path extending between the light source and the image area for periodically interrupting said light path, thereby modulating the light emitted by said light source; and elongated light conducting means including a helical portion comprised of the torsion of said light conducting means about the longitudinal axis thereof for receiving said modulated light and for transmitting said modulated light to said image area, said helical portion providing multiple reflecting paths for complete mixing of said received modulated light passing through said light conducting means such that each portion of said illuminated image area simultaneously receives light of substantially the ame intensity.

2. The apparatus of claim 1 wherein said helical portion of said light conducting means is disposed in a middle section thereof and said light conducting means includes substantially straight first and second end sections.

3. The apparatus of claim 1 wherein said light conducting means is comprised of a light conducting rod having a multiangular cross-section.

4. The apparatus of claim 3 wherein said light conducting rod includes a light receiving side comprised of a plane normal to the longitudinal axis of said light conducting rod.

5. The apparatus of claim 3 wherein said light conducting rod includes substantially straight first and second end sections and a light receiving side comprised of a cylindrical lens for refracting said modulated light transmitted to said light receiving side whereby said refracted light is reflected in said first straight end section.

6. The apparatus of claim 3 wherein said light conducting rod is comprised of glass having a surface exhibiting high light reflectance.

7. The apparatus of claim 6 wherein said glass is color tinted glass.

8. The apparatus of claim 3 wherein said light conducting rod is comprised of light conducting plastic having a surface exhibiting high light reflectance.

9. The apparatus of claim 8 wherein said light conducting plastic is color tinted plastic.

* * * * *